United States Patent [19]

Hahn

[11] Patent Number: 4,500,129
[45] Date of Patent: Feb. 19, 1985

[54] PROTECTIVE PAD

[76] Inventor: Terrence P. Hahn, 32032 Via Slona, San Juan Capistrano, Calif. 92693

[21] Appl. No.: 473,797

[22] Filed: Mar. 9, 1983

[51] Int. Cl.³ .............................................. A47G 7/02
[52] U.S. Cl. ....................................... 294/172; 47/67; 150/52 R; 294/141; 428/35; 428/99
[58] Field of Search ............... 150/52 R; 428/100, 99, 428/35, 52; 206/423; 47/67; 294/141, 149, 172; 52/3, 4

[56] References Cited

U.S. PATENT DOCUMENTS

| 2,637,136 | 5/1953 | Mark ................................... 150/52 R |
| 3,134,416 | 5/1964 | Magyar ............................. 150/52 R |
| 3,310,091 | 3/1967 | Geisen et al. .................... 428/100 X |
| 3,557,856 | 1/1971 | Berman ............................. 150/52 R |
| 3,818,633 | 6/1974 | Sable ....................................... 47/67 |
| 4,405,673 | 9/1983 | Fridley et al. ....................... 428/80 |

Primary Examiner—Henry F. Epstein
Attorney, Agent, or Firm—Koppel & Harris

[57] ABSTRACT

A protective pad includes a sheet of flexible material. A plurality of fasteners are spaced around the edge of the sheet in the corners, and adjacent fasteners can be attached to each other. When the fasteners are attached, the edge of the sheet is forced upward slightly to form a lip around the top face of the pad to retain soil, debris and water. When the fasteners are not attached, the flexible material lies flat. Handles across opposite corners are used to fold the pad and to carry it.

6 Claims, 4 Drawing Figures

U.S. Patent  Feb. 19, 1985  4,500,129
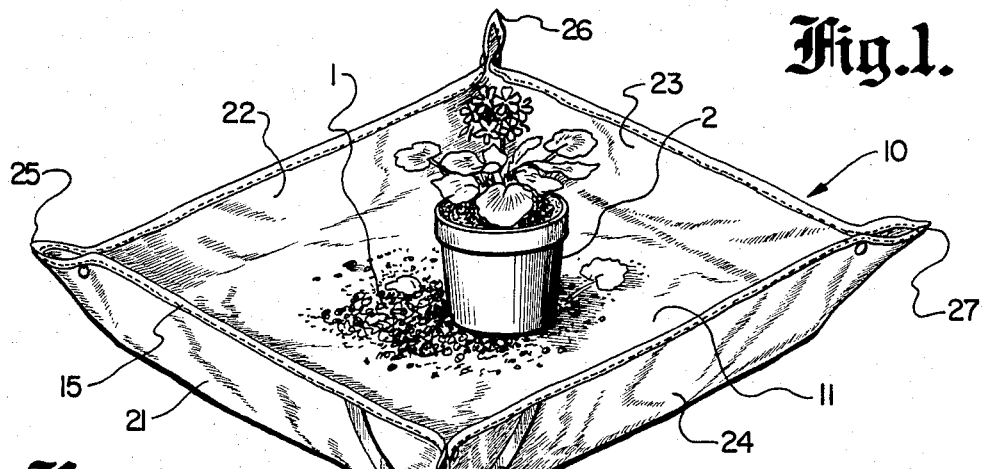
Fig.1.
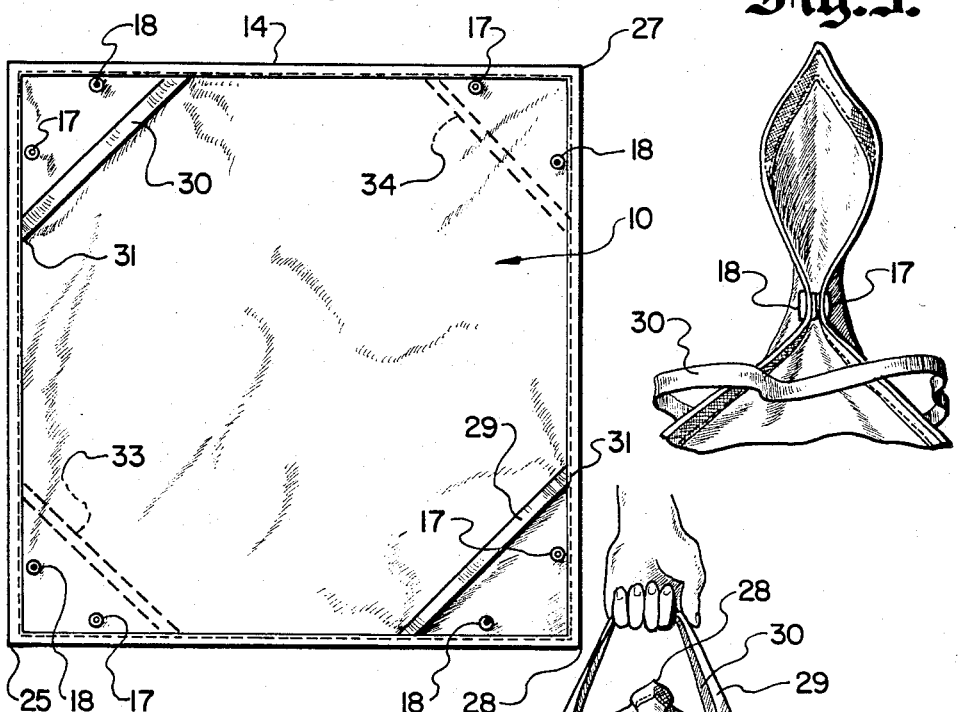
Fig.2.
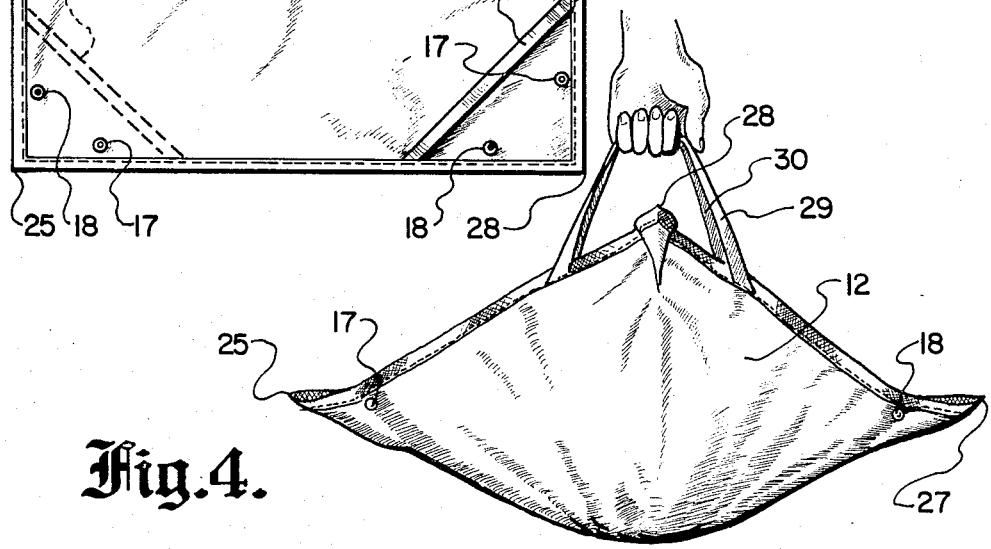
Fig.3.
Fig.4.

PROTECTIVE PAD

BACKGROUND OF INVENTION

1. Field of Invention

The present invention relates to a pad especially one on which transplanting and other indoor gardening can take place.

2. Description of the Prior Art

Indoor gardening can be somewhat messy. During many operations, soil falls out of the pot, and water may be splashed or leak from the bottom of the pot. Without protection, soil, debris and water can damage furniture and carpet. One can protect floors and furniture with plastic, paper, cardboard, or fabric sheets, and most provide some protection.

When soil and debris drop from a pot or water flows from it, they frequently do not stay neatly on the sheet. Water tends to flow, and soil and other debris rolls or moves off of the protective device. When indoor gardening is completed, the sheet must be removed. It may be somewhat difficult to fold together correctly all of the parts of the cover so that water and other soil and debris does not escape. Although upstanding sides along the edge of the cover would prevent the water, soil or other debris from moving off of the cover, a cover with an upstanding edge is more difficult to store.

SUMMARY OF THE INVENTION

One of the objects the present invention is to disclose and provide a pad that protects carpet and furniture primarily during indoor gardening activities but from other similar activities by catching soil, debris and water and by preventing them from falling or flowing off of the pad. The pad should be capable of being folded when not in use and stored in a small area. The protective pad should be moveable after use while still restraining the soil, debris and water. Another object is to disclose and provide a pad that can lie flat for certain uses but has sides that can easily be made upstanding and can be easily released so that the pad can lie flat.

These objects are satisfied by the pad of the present invention which comprises a sheet of flexible material preferably either rectangular or square. A pair of fasteners in each corner of the pad may be fastened together to fold the edge of the flexible material upward forming a lip around the top face of the pad. Handles, which preferably are on the underside of the pad near the corners, are used to lift the pad. Lifting the handles also folds the corners of the pads over each other so that any soil, debris or water is collected in the central area of the pad for ease of disposal.

BRIEF DESCRIPTION OF THE DRAWINGS

FIG. 1 is a perspective view of the protective pad of the present invention showing it in use with a potted plant resting on the pad.

FIG. 2 is a bottom view of the pad in its flat position.

FIG. 3 shows the fastening means at a corner of the protective pad of the present invention.

FIG. 4 shows a side view of the pad being carried for disposal of debris.

DETAILED DESCRIPTION OF THE PREFERRED EMBODIMENT

The protective pad of the present invention comprises a sheet 10 of flexible material forming a top face 11 and a bottom face 12. The flexible material chosen may be any non-porous material. Many types of plastic sheeting are available, but woven fabrics and paper may also be acceptable if coated or treated to protect the material. Binding 14 may be stitched around the edge 15 of pad 10 to protect the edge and for other reasons. In the exemplary embodiment, the pad is square, but it may be rectangular, circular or any other desired shape.

A plurality of fastening means are spaced around edge 15 of sheet 10. In the exemplary embodiment, the fastening means comprises adjacent male and female snaps 17 and 18 of conventional construction that are attached through sheet 10 near corners 25, 26, 27 and 28 of the sheet. Adjacent fastening means (i.e. snaps 17 and 18) are attachable to each other as shown in FIG. 3. When adjacent snaps 17 and 18 are attached, the pad assumes a configuration shown in FIG. 1 where edges 15 are forced upward to form lips 21, 22, 23, and 24 around the pad. When adjacent snaps 17 and 18 are released the sheet of flexible material 10 assumes a flat configuration as shown in FIG. 2.

Although the pad can be used in its flat configuration (FIG. 2), soil, debris and water 1 from potted plant 2 cannot flow or move off top surface 11 of sheet of flexible material 10 when the sheet is in its FIG. 1 shape.

When one no longer is using the pad, it may be picked up using handle means that are attached to the pad. In the exemplary embodiment, handle means 29 and 30 are sewn to binding 14 across opposite corners 26 and 28 as shown at 31 (FIG. 2). The handles are also formed of plastic straping material, flexible but of relatively high tensile strength, but they may be of other materials too. Handles 30 and 29 are mounted to the bottom of the pad so that they will not interfere with work on top surface 11 and to keep them clean. Although only two handles 29 and 30 are shown, other handles (e.g. handles 33 and 34) could be attached across the other corners of sheet 10.

When one is finished using the pad he or she lifts handles 29 and 30 around corners 28 and 26 as shown in FIG. 4. The folding of the corners 25 and 27 by adjacent snaps 17 and 18, the position of handles 29 and 30 across corners 26 and 28, and the weight of any water or debris in the protective pad causes the pad to assume the configuration shown in FIG. 4, which prevents any of the debris or water from dropping from the pad. One can then transport the pad outside, to a waste basket or a sink to dispose of the water, soil or debris. After rinsing top surface 11 or wiping it and after unsnapping all of the snaps 17 and 18, the pad can be folded from its flat configuration in FIG. 2 into a small sized packaged for storage.

Various modifications and changes may be made in the configuration described in this specification that may come within the spirit of this invention. The invention embraces all of these changes and modifications coming within the scope of the claims.

I claim:

1. A pad comprising a sheet of flexible material having a top and bottom face, a plurality of fastening means spaced around the edge of the flexible material on the top face, adjacent fastening means being attached to each other for folding the edge of the flexible material upward to form a lip around the top face of the pad, the flexible material lying flat when the fastening means are released from each other, and handle means having at least two opposed handles near the edge of the pad for holding the pad and positioned to fold the edges of the pad toward each other when the pad is lifted by the handles.

2. The pad of claim 1 wherein the handle means is attached to the bottom face of the pad.

3. The pad of claim 1 further comprising a binding around the edge of the flexible material, the handle means being attached to the binding.

4. The pad of claim 1, the flexible material having four sides, the fastening means comprising a pair of fasteners in each corner of the pad, each fastener of the pair of fasteners being connected to the other fastener of the pair of fasteners, the top face of the flexible material in the corner being pinched together when the fasteners are connected to each other.

5. The pad of claim 4, the handle means being on the bottom of the pad and positioned across at least two opposite corners of the pad for folding the corners toward each other when lifting the pad by the handles.

6. The pad of claim 5 wherein the handle means is of a length such that it lies flat when the sheet of flexible material is flat.

* * * * *